US010936476B2

(12) United States Patent
Padilla-Ruberte

(10) Patent No.: US 10,936,476 B2
(45) Date of Patent: *Mar. 2, 2021

(54) REGRESSION TESTING OF NEW SOFTWARE VERSION AND DEPLOYMENT

(71) Applicant: International Business Machines Corporation, Armonk, NY (US)

(72) Inventor: Cresyi Padilla-Ruberte, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 16/367,647

(22) Filed: Mar. 28, 2019

(65) Prior Publication Data

US 2019/0227913 A1 Jul. 25, 2019

Related U.S. Application Data

(63) Continuation of application No. 15/815,748, filed on Nov. 17, 2017, now Pat. No. 10,310,967.

(51) Int. Cl.
*G06F 9/44* (2018.01)
*G06F 11/36* (2006.01)
(Continued)

(52) U.S. Cl.
CPC ........... *G06F 11/3684* (2013.01); *G06F 8/60* (2013.01); *G06F 8/71* (2013.01); *G06F 11/368* (2013.01); *G06F 11/3688* (2013.01)

(58) Field of Classification Search
CPC ...... G06F 11/3684; G06F 8/71; G06F 11/368; G06F 11/3688
(Continued)

(56) References Cited

U.S. PATENT DOCUMENTS 5,694,540 A * 12/1997 Humelsine ............... G06F 8/71
714/33
6,490,696 B1 * 12/2002 Wood .................. G06F 11/3688
714/38.1
(Continued)

FOREIGN PATENT DOCUMENTS

WO 2017044069 A1 3/2017

OTHER PUBLICATIONS

Memon, "Automatically Repairing Event Sequence-Based GUI Test Suites for Regression Testing", ACM, pp. 1-36 (Year: 2008).*
(Continued)

*Primary Examiner* — Anil Khatri
(74) *Attorney, Agent, or Firm* — Cantor Colburn LLP; Teddi Maranzano

(57) ABSTRACT

Embodiments described herein are directed to computer-implemented methods, systems, and computer program products for regression testing. New techniques for software regression testing are provided in which the regression test scenarios are directly synchronized with the user's system and environment. This can be referred to as a customized-regression-test process. A non-limiting example of a computer-implemented method includes receiving a history log having application data for an application during normal use and generating a regression test scenario for a new version of the application based on a pattern of use of the application. The method further includes determining whether one or more existing regression test scenarios stored in a test scenario data store match the generated regression test scenario and executing a regression test on the new version of the application using the regression test scenario.

14 Claims, 6 Drawing Sheets

(51) Int. Cl.
*G06F 8/71* (2018.01)
*G06F 8/60* (2018.01)

(58) Field of Classification Search
USPC .................................. 717/124–130, 139–145
See application file for complete search history.

(56) References Cited

U.S. PATENT DOCUMENTS

| | | | |
|---|---|---|---|
| 6,694,509 B1* | 2/2004 | Stoval | G06F 11/3688 707/999.202 |
| 6,748,584 B1 | 6/2004 | Witchel et al. | |
| 6,898,735 B2 | 5/2005 | Tuttle | |
| 6,944,848 B2 | 9/2005 | Hartman | |
| 6,986,125 B2 | 1/2006 | Apuzzo et al. | |
| 7,222,265 B1* | 5/2007 | LeSuer | G06F 11/3414 714/38.1 |
| 7,433,852 B1* | 10/2008 | Bertrand | G09B 7/04 706/45 |
| 7,818,275 B2 | 10/2010 | Bertrand | |
| 7,840,944 B2 | 11/2010 | Brunswig | |
| 8,006,204 B2 | 8/2011 | Killian et al. | |
| 8,276,123 B1* | 9/2012 | Deng | G06F 11/3688 714/37 |
| 8,392,896 B2* | 3/2013 | Stone | G06F 11/3684 717/140 |
| 8,458,662 B2* | 6/2013 | Grechanik | G06F 11/368 717/124 |
| 8,578,344 B2 | 11/2013 | Godefroid et al. | |
| 8,589,884 B2* | 11/2013 | Gorthi | G06F 11/3688 714/38.1 |
| 8,745,589 B2 | 6/2014 | Arumugham | |
| 8,793,656 B2* | 7/2014 | Huang | G06F 11/3688 717/124 |
| 8,874,477 B2* | 10/2014 | Hoffberg | G06Q 10/103 705/37 |
| 8,954,930 B2 | 2/2015 | Kamenz et al. | |
| 8,990,774 B2* | 3/2015 | Amintafreshi | G06F 11/3692 717/124 |
| 9,032,370 B2* | 5/2015 | Chakraborty | G06F 11/3672 717/124 |
| 9,201,773 B1* | 12/2015 | Cohen | G06F 8/30 |
| 9,355,016 B2 | 5/2016 | Baril | |
| 9,361,211 B2* | 6/2016 | Gupta | G06F 11/3688 |
| 9,411,710 B2* | 8/2016 | Kumar | G06F 11/3676 |
| 9,471,469 B2 | 10/2016 | Mishra | |
| 9,471,470 B2 | 10/2016 | Prasad et al. | |
| 9,594,665 B2 | 3/2017 | Baril | |
| 9,703,849 B2* | 7/2017 | Greenwood | G06F 16/254 |
| 9,710,368 B1 | 7/2017 | Gundeti et al. | |
| 10,282,283 B2* | 5/2019 | Finger | G06F 11/3692 |
| 10,380,004 B2* | 8/2019 | Liemandt | G06F 11/3688 |
| 2006/0129992 A1 | 6/2006 | Oberholtzer et al. | |
| 2011/0145653 A1 | 6/2011 | Broadfoot et al. | |
| 2016/0062876 A1 | 3/2016 | Narayanan | |
| 2017/0192873 A1 | 7/2017 | Ozdemir et al. | |

OTHER PUBLICATIONS

Orso et al, "Leveraging Field Data for Impact Analysis and Regression Testing", ACM, pp. 128-137 (Year: 2003).*
Gupta et al, "An Approach to Regression Testing using Slicing", ACM, pp. 12-16 (Year: 1992).*
Srikanth et al, "System Test Case Prioritization of New and Regression Test Cases", IEEE, pp. 64-73 (Year: 2005).*
Abele et al, "Supporting the Regression Test of Multi-Variant Systems in Distributed Production Scenarios", IEEE, pp. 1-4 (Year: 2016).*
Kaur et al, "Prioritization of Test Scenarios Derived from UML Activity Diagram Using Path Complexity", ACM, pp. 355-359 (Year: 2012).*
Elbaum et al, "Techniques for Improving Regression Testing in Continuous Integration Development Environments", ACM, pp. 235-245 (Year: 2014).*
Leung et al, "Insights into Regression Testing", IEEE, pp. 60-69 (Year: 1989).*
Mei et al, "Test Case Prioritization for Regression Testing of Service-Oriented Business Applications", ACM, pp. 901-910 (Year: 2009).*
Biswas et al, "A Model-Based Regression Test Selection Approach for Embedded Applications", ACM, pp. 1-9, 2009 (Year: 2009).
Chittimalli et al, "Regression Test Selection on System Requirements", ACM, pp. 87-96, 2008 (Year: 2008).
Huang et al, "ORTS: A Tool for Optimized Regression Testing Selection", ACM, pp. 803-804, 2009 (Year: 2009).
J. P. Sandoval Alcocer, et al.,"Learning from Source Code History to Identify Performance Failures," ICPE, ACM, Mar. 12-18, 2016, p. 1-12.
Mostafa et al, "PerfRanker: Prioritization of Performance Regression Tests for Collection-Intensive Software", ACM, pp. 23-34, 2017 (Year: 2017).
Ngah et al, "Regression Test Selection by Exclusion Using Decomposition Slicing", ACM, pp. 23-24, 2009 (Year: 2009).
Rothermel et al, "A Safe, Efficient Regression Test Selection Technique", ACM Transactions on Software Engineering and Methodology, vol. 6, No. 2, pp. 173-210, 1997 (Year: 1997).
Shi et al, "Comparing and Combining Test-Suite Reduction and Regression Test Selection", ACM, pp. 237-247, 2015 (Year: 2015).
List of IBM Patents or Patent Applications Treated as Related (Appendix P), Date Filed Mar. 28, 2019; 2 pages.
Cresyi Padilla-Ruberte, "Regression Testing of New Software Version and Deployment," U.S. Appl. No. 15/815,748, filed Nov. 17, 2017.

* cited by examiner

REGRESSION TESTING OF NEW SOFTWARE VERSION AND DEPLOYMENT

DOMESTIC PRIORITY

This application is a continuation of U.S. application Ser. No. 15/815,748, titled "Regression Testing" filed Nov. 17, 2017, the contents of which are incorporated by reference herein in its entirety

BACKGROUND

The present invention generally relates to data processing, and more specifically, to regression testing.

Computer processing systems (e.g., laptops, smartphones, wearable computing devices, desktop computers, etc.) execute software (e.g., operating systems, applications, etc.) to process data. It is beneficial to perform software testing to test the software to determine whether the software meets design and development requirements, responds correctly to various inputs, perform functions timely, is sufficiently usable, can operate in its intended environment, achieves desired results, and operates reliably and consistently. One type of software testing is regression testing, which verifies that previously developed software continues to perform in the same way following a change to the software. For example, if the software is changed (e.g., updated, enhanced, patched, reconfigured, etc.), it may be desirable to perform software regression testing to confirm that the software still performs as it did prior to the change(s).

SUMMARY

Embodiments described herein are directed to computer-implemented methods, systems, and computer program products for regression testing. A non-limiting example of a computer-implemented method includes receiving, by a processing system, application data from a user processing system deploying utilizing an application during normal use of the application. The method further includes generating, by the processing system, a regression test scenario for a new version of the application to be deployed on the user processing system, wherein the regression test scenario is based at least in part on the application data received from the user processing system. The method further includes performing, by the processing system, a regression test on the new version of the application using the regression test scenario.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
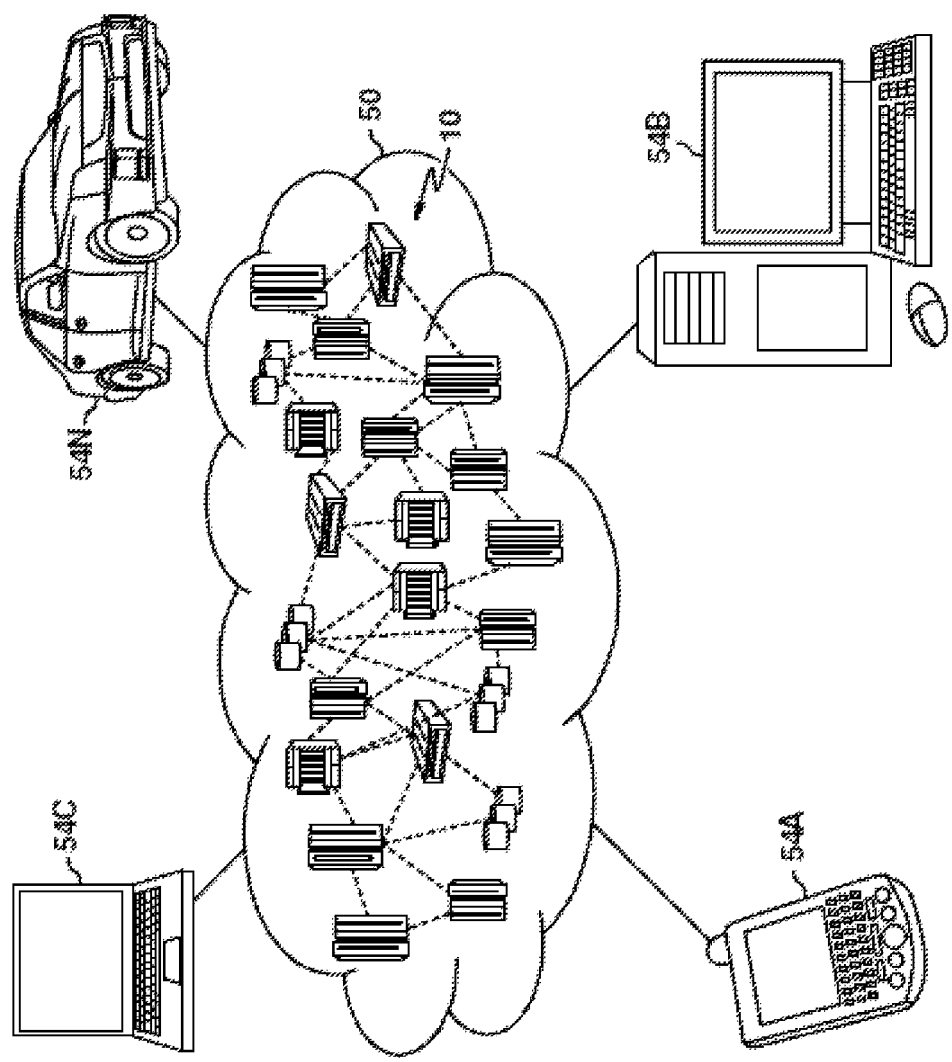
FIG. 1 depicts a cloud computing environment according to aspects of the present disclosure.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
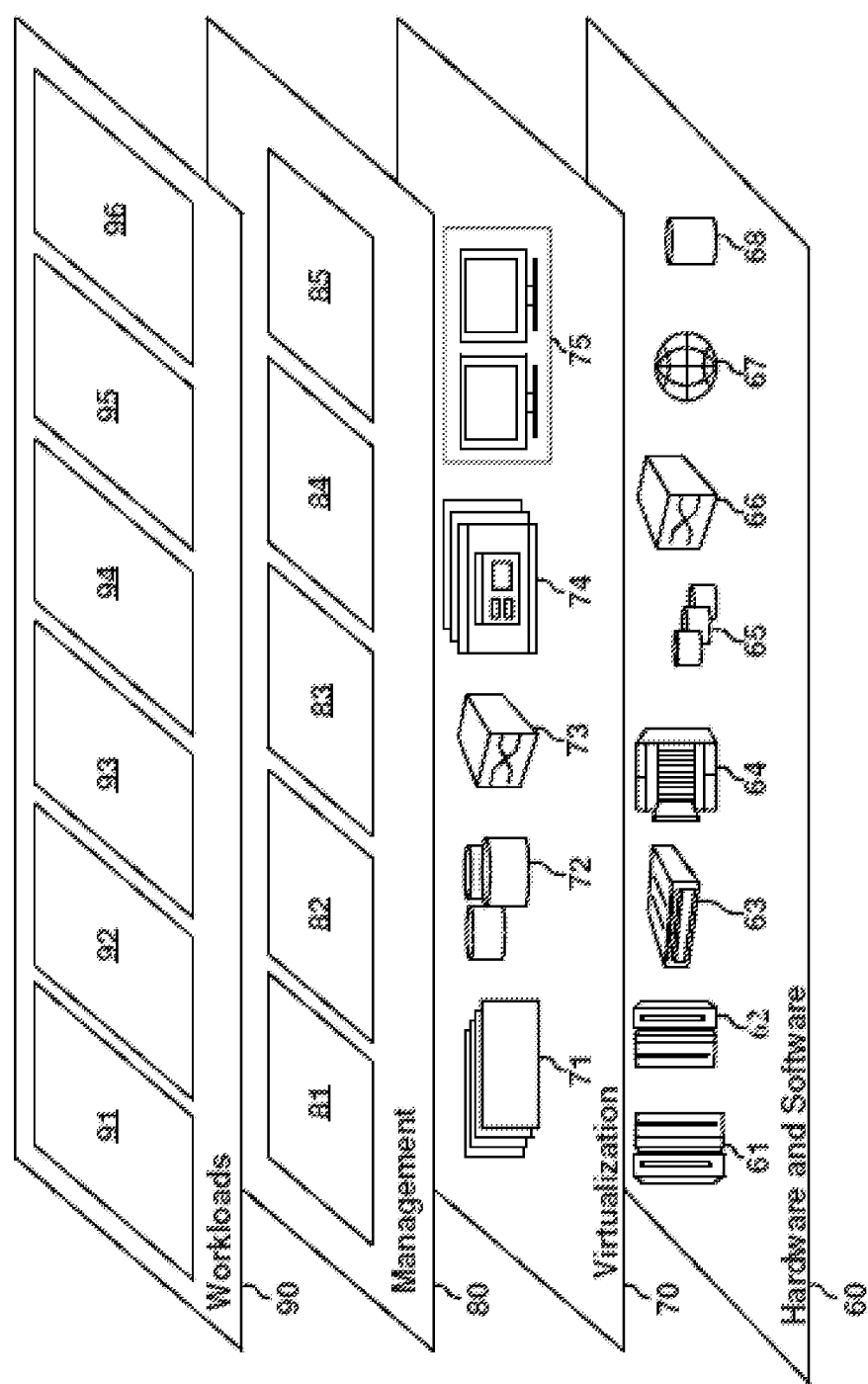
FIG. 2 depicts abstraction model layers according to aspects of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application regression testing 96.

Figure 3:
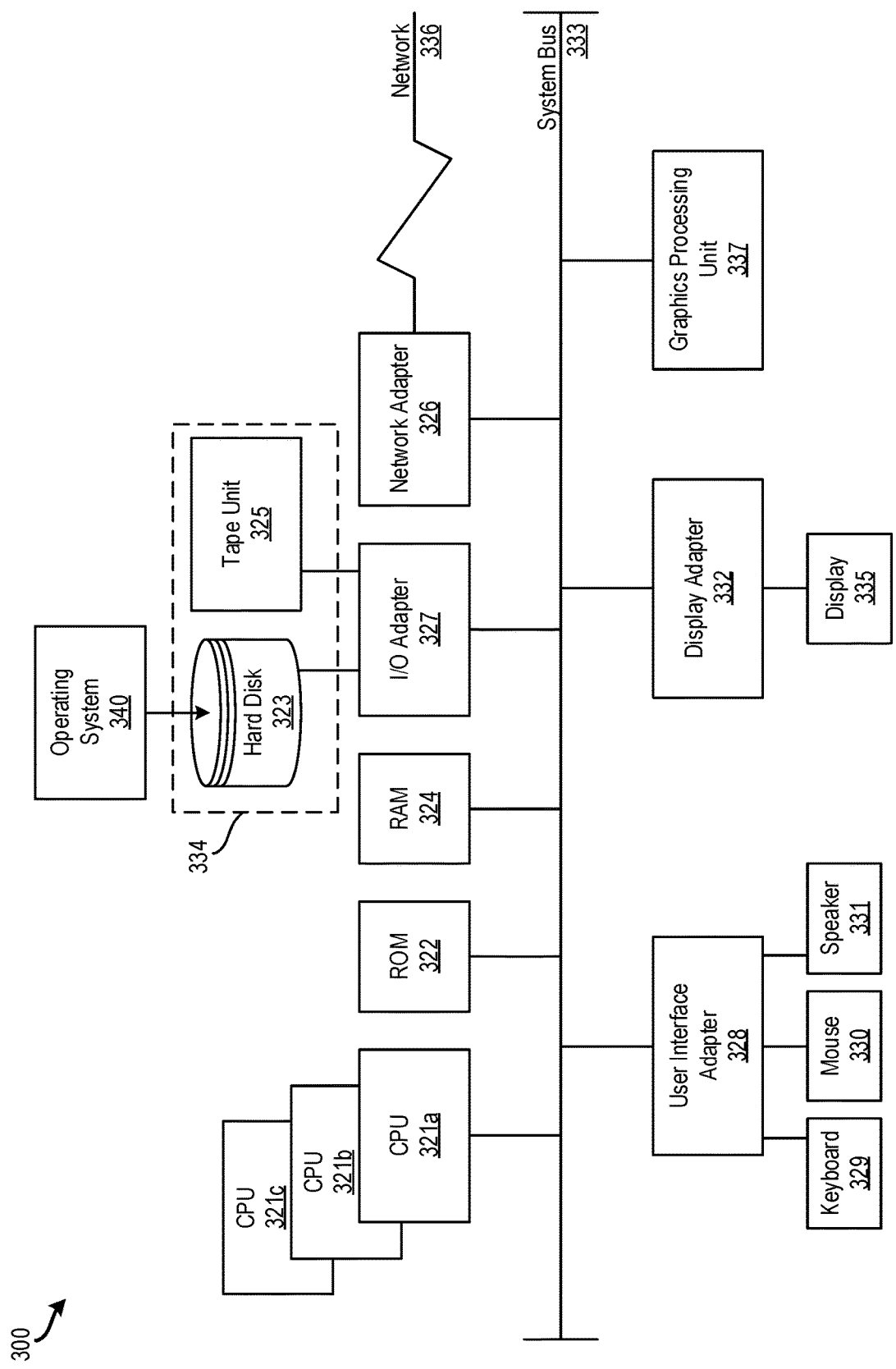
FIG. 3 depicts a processing system for implementing the techniques described herein according to aspects of the present disclosure.

It is understood that embodiments of the present invention are capable of being implemented in conjunction with any other suitable type of computing environment now known or later developed. For example, FIG. 3 illustrates a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 may include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further illustrated are an input/output (I/O) adapter 327 and a communications adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. A network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the present disclosure, regression testing for software is now described. Traditional software regression test is performed in a controlled and normalized test standardized environment, and the test scenarios that define the regression test conform to a series of steps that are ideal, expected, or suggested in general across all users of the software. Some software (also referred to as applications, programs, or products) are implemented such that the user can deviate from a normal or expected implementation and follow a more customized process. For example, the configuration of users' systems and operating system environments can vary. Traditional software regression testing are based on initial test scenarios that are also based on normalized test environments and systems, disregarding customized or otherwise configured systems or special scenarios for particular users.

In some cases, users have reported issues on functions that were tested successfully during traditional regression testing. Although sometimes the regressing test may be incorrect, in many cases the failure or unexpected behavior is a result of users' custom processes or specific characteristics of the users' system. These special cases could also be considered stress tests. It is possible that a product that passed regression test after a new function was implemented can still fail on a user's system. The root of the problem may be related to a change on the customer's system environment, for example, that was not known or anticipated during the regression testing.

For example, a certain user uses an application that normally manages an X amount of data. Thereafter, the customer encounters a situation in which a load of data is about 5 times X. A current release of the application operated successfully on the new data load and has been working normally until an update to the application was issued. The update to the application passed traditional regressing testing and in theory should continue to handle the increased load of data. However, the regression testing only considered X amount of data. Although the update to the application was not expected to have any effect in the data load management, there is an unexpected failure in the application after the update is implemented on the customer's system apparently due to data overload. Traditional regression testing fails to consider user's individual, customized use cases and therefore are not sufficient or adequate to properly test software changes.

The present disclosure describes new techniques for software regression testing in which the regression test scenarios are directly synchronized with the user's system and environment. This can be referred to as a customized-regression-test process. A user's system logs system activity, such as changes to settings, amount of data used, processing demands, system updates/upgrades, other software application installations/updates, etc., which is stored in a history log. The history log is used to determine a pattern of use and generate a use case that is adapted and stored for regression testing. For example, suppose that a certain application's fix pack is ready for regression testing. The fix pack includes new functionality requested by customers A and B who have been using the application for some time, and the application has automatically generated regression test scenarios. As part of the regression testing, a test team has access to the customers' system through a network and concurrently deploys a staged upgrade of the new fix pack. As part of the staged upgrade process, the application automatically runs the regression test through an engine and generates a status report.

The present techniques address the above-described shortcomings of the prior art by greatly expand regressing test coverage without increasing the regression test cycle time while improving the accuracy of scenarios used during regressing testing. In fact, the present techniques suggest that the regression testing performed from a normalized test environment and the customers' systems can be run concurrently. Thus, more testing can be performed in less time. Also, the present techniques minimize a number of scenarios in the general regression test queue.

Figure 4:
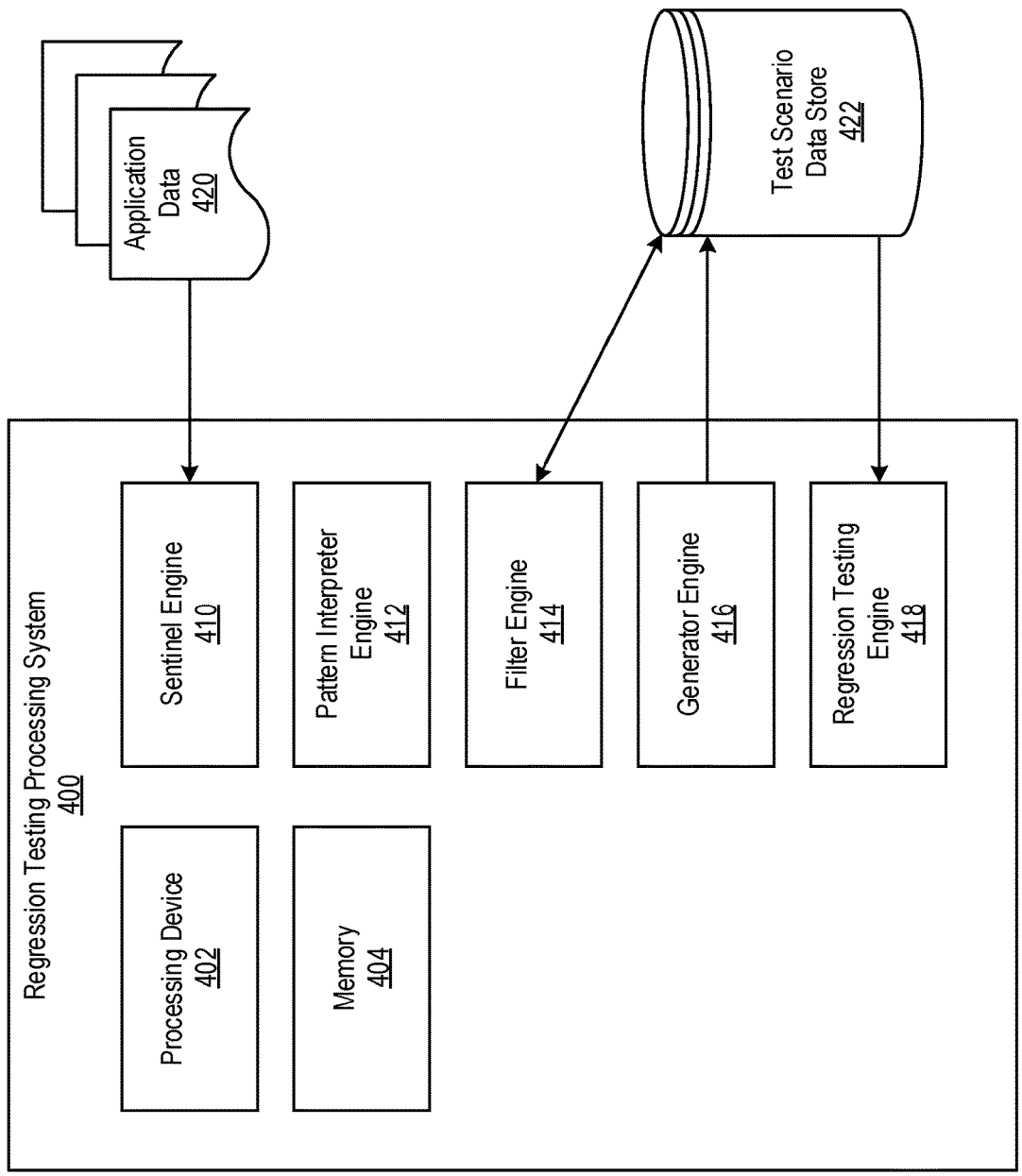
FIG. 4 depicts a processing system for regression testing according to aspects of the present disclosure.

FIG. 4 depicts a processing system 400 for regression testing according to aspects of the present disclosure. The processing system 400 includes a processing device 402, a memory 404, a sentinel engine 410, a pattern interpreter engine 412, a filter engine 414, a generator engine 416, and a regression testing engine 418.

The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., the memory 404) can store program instructions that when executed by the processing device 402 implement the engines described herein. Other engines can also be utilized to include other features and functionality described in other examples herein.

The sentinel engine 410 observes and tracks, during normal use of the application, applicable application data 420 (e.g., commands and behavior) that are considered candidates for regression test scenarios on a customer's system. The sentinel engine 410 also understands the customer's environment and platform and is aware of when an application is running on a staged-update mode or in deployed mode (normal use), which could be implemented by a flag in the application data 420 to indicate when the staged-update mode is enabled. The sentinel engine 410 has a pre-loaded set of commands, syntax, and data types to observe and track.

The pattern interpreter engine 412 receives candidates for scenarios from the sentinel engine 410 and identifies the steps, commands, and data used to generate an actual customer regression test scenario. The pattern interpreter engine 412 (as well as the filter engine 414 and the generator engine 416 (further described)) understands the logical flow of the application in use (e.g., a login action would happen before a preference setting action).

The filter engine 414 compares potential regression test scenarios, identified by the pattern interpreter engine 412, with already existing regression test scenarios, such as in the test scenario data store 422, to avoid duplicates. This prevents unnecessary regression test scenarios from being generated and stored if the same (or substantially similar, and not better) scenarios already exist in the test scenario data store 422. A substantially similar scenario may already exist in the data store, however, if the newly generated scenario is considered a better scenario it may added to, or replace the older similar scenario on, the data store.

The generator engine 416 creates a new scenario based on the data collected and filtered (e.g., the application data 420), and stores it into the test scenario data store 422. Each created scenario is also categorized based on its effect if it fails. For example, a certain test scenario could be a "blocker" for the entire application to run if the regression test fails; therefore, if it fails, the regression testing engine 418 stops stop the test cycle.

The test scenario data store 422 stores regression testing scenarios independent from the application, which can reside in another data store. However, in some examples, the data stores can be combined. The test scenario data store 422 is accessible by the regression testing processing system 400, such as via a network connection. In some examples, the test scenario data store 422 is a component of the regression testing processing system 400.

Regression testing is performed by the regression testing engine 418 based on one or more test scenarios stored in the test scenario data store 422. During the regression testing, a test team is able to access the customer's system through a network, cloud, or other communicative connection to stage an update of the application or software. Once the stage mode enabled, the sentinel engine 410 calls the regression test engine 418, which performs the regression testing and creates reports based on the regressing testing. Once the regression testing is completed, the sentinel engine 410 is notified, which then notifies the test team about the completion and provides general statics of successes and failures (e.g., the reports based on the regression testing). For example, in the case of a failure, a report an be generated and provided to a development team. The report includes details describing the failure so that the development team can address the issue, if necessary.

Figure 5:
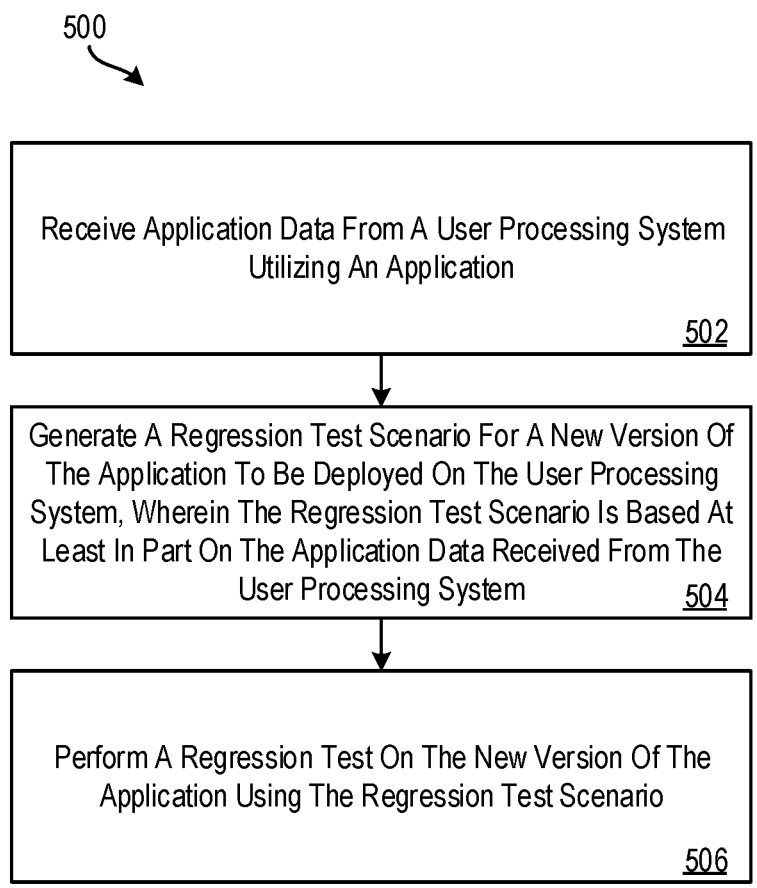
FIG. 5 depicts a flow diagram of a method for regression testing according to aspects of the present disclosure.

FIG. 5 depicts a flow diagram of a method 500 for regression testing according to aspects of the present disclosure. The method 500 can be implemented using one or more processing system(s) and/or processing device(s), such as the processing system 300 of FIG. 3, the processing systems 400 of FIG. 4, or another suitable processing system and/or processing device.

At block 502, the regression testing processing system 400 receives application data 420 from a user processing system utilizing an application.

At block 504, the regression testing processing system 400 generates a regression test scenario for a new version of the application to be deployed on the user processing system. The regression test scenario is based at least in part on the application data received from the user processing system. This enables custom regression test scenarios to be generated for different users' systems and environments that deploy the application.

At block 506, the regression testing processing system 400 performs a regression test on the new version of the application using the regression test scenario. If the regression test passes, the new version of the application can be safely deployed to the user processing system. However, if the regression test fails, a report can be generated to indicate why the regression test fails. In some examples, if the regression test fails, a new version of the application may or may not be automatically prevented from being deployed to the user processing system.

Additional processes also may be included. For example, the regression testing processing system 400 can store the regression test scenario to the test scenario data store 422. The regression testing processing system 400 can also filter regression tests stored in the test scenario data store 422 to determine whether the generated regression test scenario matches any existing/stored regression test scenarios. If a match is determined, the regression testing processing system 400 does not store the generated regression test scenario in the test scenario data store 422. This avoids duplicates, saves data, and reduces system complexity. It should be understood that the processes depicted in FIG. 5 represent illustrations and that other processes may be added or existing processes may be removed, modified, or rearranged without departing from the scope and spirit of the present disclosure.

Figure 6:
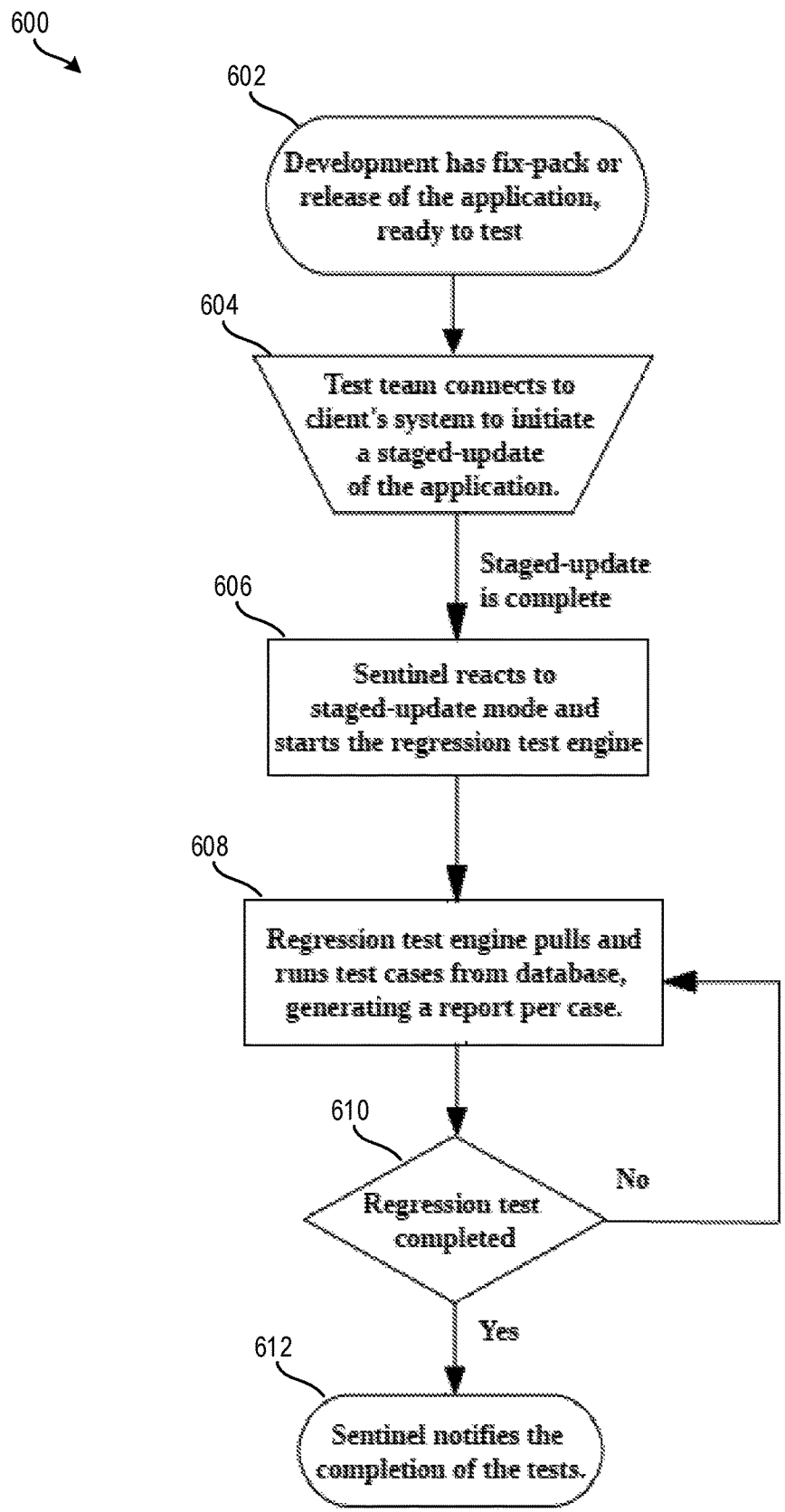
FIG. 6 depicts a flow diagram of a method for regression testing according to aspects of the present disclosure.

FIG. 6 depicts a flow diagram of a method 600 for regression testing according to aspects of the present disclosure. The method 600 can be implemented using one or more processing system(s) and/or processing device(s), such as the processing system 300 of FIG. 3, the processing systems 400 of FIG. 4, or another suitable processing system and/or processing device.

At block 602, a development team has an update (e.g., a fix-pack, a new release, etc.) for an application that is ready for regression testing. At block 604, the test team connects to the user's (e.g., client, customer, etc.) processing system to initiate a staged-update of the application. At block 606, the sentinel engine 410 reacts to the staged-update mode (e.g., using a flag stored in the application data 420) and initiates the regression testing engine 418. At block 608, the regression test engine 418 pulls one or more testing scenarios from a database (e.g., the test scenario data store 422) and begins running the scenarios. A report can be generated for each scenario. The regression testing engine 418 continues to test the scenarios until it is determined, at block 610, that the regression test is completed. Once complete, at block 612, the sentinel engine 410 notifies the test team and/or the user that the regression testing is complete.

Additional processes also may be included, and it should be understood that the processes depicted in FIG. 6 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processing system, a history log comprising application data from a user processing system utilizing an application during normal use of the application;
   generating, by the processing system, a potential regression test scenario for a new version of the application to be deployed on the user processing system, wherein the potential regression test scenario is based at least in part on a pattern of use for the application;
   determining whether one or more existing regression test scenarios stored in a test scenario data store match the potential regression test scenario;
   responsive to determining that the potential regression test scenario does not already exist
   in the test scenario data store, modifying the test scenario data store to include the potential regression test scenario: and
   executing, by the processing system, a regression test on the new version of the application using the potential regression test scenario;
   deploying the new version of the application to the user processing system based at least in part on the regression test being successful.

2. The computer-implemented method of claim 1, further comprising, responsive to determining that one or more existing regression test scenarios match the potential regression test scenario, not storing the potential regression test scenario to the test scenario data store.

3. The computer-implemented method of claim 1, further comprising, responsive to determining that the potential regression test scenario is substantially similar to, but better than, one or more existing regression test scenarios, replacing the one or more existing regression test scenarios with the potential regression test scenario.

4. The computer-implemented method of claim 1, further comprising generating a failure report based at least in part on the regression test being unsuccessful.

5. The computer-implemented method of claim 1, wherein the application data comprises a flag to indicate that the application is running in a staged-update mode.

6. A system comprising:
a memory comprising computer readable instructions; and
a processing device for executing the computer readable instructions for performing a method, the method comprising:
receiving, by the processing system, a history log comprising application data from a user processing system utilizing an application during normal use of the application;
generating, by the processing system, a potential regression test scenario for a new version of the application to be deployed on the user processing system, wherein the potential regression test scenario is based at least in part on a pattern of use for the application;
determining whether one or more existing regression test scenarios stored in a test scenario data store match the potential regression test scenario;
responsive to determining that the potential regression test scenario does not already exist
in the test scenario data store, modifying the test scenario data store to include the potential regression test scenario: and
executing, by the processing system, a regression test on the new version of the application using the potential regression test scenario;
deploying the new version of the application to the user processing system based at least in part on the regression test being successful.

7. The system of claim 6, further comprising, responsive to determining that one or more existing regression test scenarios match the potential regression test scenario, not storing the potential regression test scenario to the test scenario data store.

8. The system of claim 6, further comprising, responsive to determining that the potential regression test scenario is substantially similar to, but better than, one or more existing regression test scenarios, replacing the one or more existing regression test scenarios with the potential regression test scenario.

9. The system of claim 6, further comprising generating a failure report based at least in part on the regression test being unsuccessful.

10. The system of claim 6, wherein the application data comprises a flag to indicate that the application is running in a staged-update mode.

11. A computer program product comprising:
a computer readable storage medium having program instructions embodied therewith, the program instructions executable by a processing device to cause the processing device to perform a method comprising:
receiving, by the processing system, a history log comprising application data from a user processing system utilizing an application during normal use of the application;
generating, by the processing system, a potential regression test scenario for a new version of the application to be deployed on the user processing system, wherein the potential regression test scenario is based at least in part on a pattern of use for the application;
determining whether one or more existing regression test scenarios stored in a test scenario data store match the potential regression test scenario;
responsive to determining that the potential regression test scenario does not already exist
in the test scenario data store, modifying the test scenario data store to include the potential regression test scenario; and
executing, by the processing system, a regression test on the new version of the application using the potential regression test scenario;
deploying the new version of the application to the user processing system based at least in part on the regression test being successful.

12. The computer program product of claim 11, further comprising, responsive to determining that one or more existing regression test scenarios match the potential regression test scenario, not storing the potential regression test scenario to the test scenario data store.

13. The computer program product of claim 11, further comprising, responsive to determining that the potential regression test scenario is substantially similar to, but better than, one or more existing regression test scenarios, replacing the one or more existing regression test scenarios with the potential regression test scenario.

14. The computer program product of claim 11, further comprising generating a failure report based at least in part on the regression test being unsuccessful.

* * * * *